US012308746B2

United States Patent
Zhu

(10) Patent No.: US 12,308,746 B2
(45) Date of Patent: May 20, 2025

(54) POWER STAGE FOR MULTIPHASE VOLTAGE REGULATOR WITH SELF-ADAPTED CURRENT BALANCING CONTROL

(71) Applicant: INNOVISION SEMICONDUCTOR INC, Dongguan (CN)

(72) Inventor: Haipeng Zhu, Dongguan (CN)

(73) Assignee: INNOVISION SEMICONDUCTOR INC. (CN)

( * ) Notice: Subject to any disclaimer, the term of this patent is extended or adjusted under 35 U.S.C. 154(b) by 324 days.

(21) Appl. No.: 17/988,894

(22) Filed: Nov. 17, 2022

(65) Prior Publication Data

US 2024/0171078 A1   May 23, 2024

(51) Int. Cl.
*H02M 1/08* (2006.01)
*H02M 3/158* (2006.01)

(52) U.S. Cl.
CPC .......... *H02M 3/1586* (2021.05); *H02M 1/08* (2013.01)

(58) Field of Classification Search
CPC .. H02M 3/156; H02M 3/1584; H02M 3/1586; H02M 1/08
See application file for complete search history.

(56) References Cited

U.S. PATENT DOCUMENTS

| 7,777,462 | B2 * | 8/2010 | Kudo | H02M 3/1584 |
| | | | | 323/272 |
| 11,682,900 | B2 * | 6/2023 | Venugopal | H02J 1/106 |
| | | | | 307/32 |
| 12,092,666 | B1 * | 9/2024 | Li | H01L 29/7815 |
| 2014/0021929 | A1 * | 1/2014 | Lin | G05F 1/10 |
| | | | | 323/271 |
| 2018/0278162 | A1 * | 9/2018 | Petricek | H02M 3/1584 |

\* cited by examiner

*Primary Examiner* — Adolf D Berhane
(74) *Attorney, Agent, or Firm* — Mark Luo

(57) ABSTRACT

Large semiconductor ICs provide the processing power for billions of electronic devices used in every facet of modern life. Multiphase voltage regulator systems are the most common means of providing the current required for these CPUs, GPUs, and ASICs. Contemporary designs require 8, 12, 16, and potentially even higher phase counts. Existing designs require each phase to have a dedicated PWM signal terminal and provide an independent current feedback line to the multiphase VR controller for current sharing purposes; this requirement drastically increases the pin count of the controller and creates congestion in PCB routing. Our new idea allows the VR controller to send only one PWM signal to all power stages and moves the current sharing function to the power stage element, thereby reducing the cost of the controller and the complexity of the PCB.

1 Claim, 5 Drawing Sheets

(Preferred Embodiment)

(Preferred Embodiment)

POWER STAGE FOR MULTIPHASE VOLTAGE REGULATOR WITH SELF-ADAPTED CURRENT BALANCING CONTROL

TECHNICAL FIELD

This invention relates to electronics, and more specifically, to current balancing of multiphase voltage regulator (VR).

BACKGROUND

A voltage regulator is an electrical circuit used to regulate a DC voltage supplied to a load. A multiphase voltage regulator includes a controller and a plurality of power stages, each configured to deliver output current through an inductor. Multiphase voltage regulators are particularly well suited for providing high current at low voltages needed by high-performance integrated circuit such as CPU, GPU, and ASIC. Typically, multiphase voltage regulator comprises of a pulse-width-modulation (PWM) controller and a set of buck converters in parallel. Each buck converter has a power stage with an inductor. The PWM controller implements close-loop control by sensing the output voltage signals to generate the PWM signals for all power stages to regulate the output voltage.

Ideally, each power stage should carry the even share of the total load current. However, due to the parameter tolerance in the manufacturing process of power stages and inductors, load current usually is not evenly shared among phases. In some extreme case, the current in one phase could even flow in the reverse direction while the other phases flow the positive current. This current unbalancing phenomenon will not only cause higher temperature stress for some power stages and trigger the over-temperature or the over-current protection, but also could degrade the lifetime of the multiphase voltage regulator. To resolve this issue, a current balancing controller must be introduced. The current balancing controller receives current feedback signals from all power stages and modifies the PWM signals for each power stage accordingly. For a multiphase voltage regulator with "n" phases, the current balancing controller needs "n" PWM signal pins and "n" IMON signal pins. Moreover, additional passive components are needed to measure the current in each phase. As the load current requirement keeps increasing, the phase number of the multiphase voltage regulator increases as well, which poses a great challenge on the total cost and the PCB layout design.

SUMMARY

In this invention, a novel power stage for multiphase voltage regulator with self-adapted current balancing control is proposed. The innovation in this invention allows the multiphase voltage regulator system to achieve current balancing without any current balancing controller. Compared with the power stage in conventional multiphase voltage regulator solution, the IMON pin is replaced by an ISHARE pin, and all power stages' ISHARE pins are connected externally. The current balancing control is implemented by circuit in each power stage. Compared with the solution that requires a current balancing controller, the proposed invention can significantly simplify the PCB layout and reduce the overall system cost.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
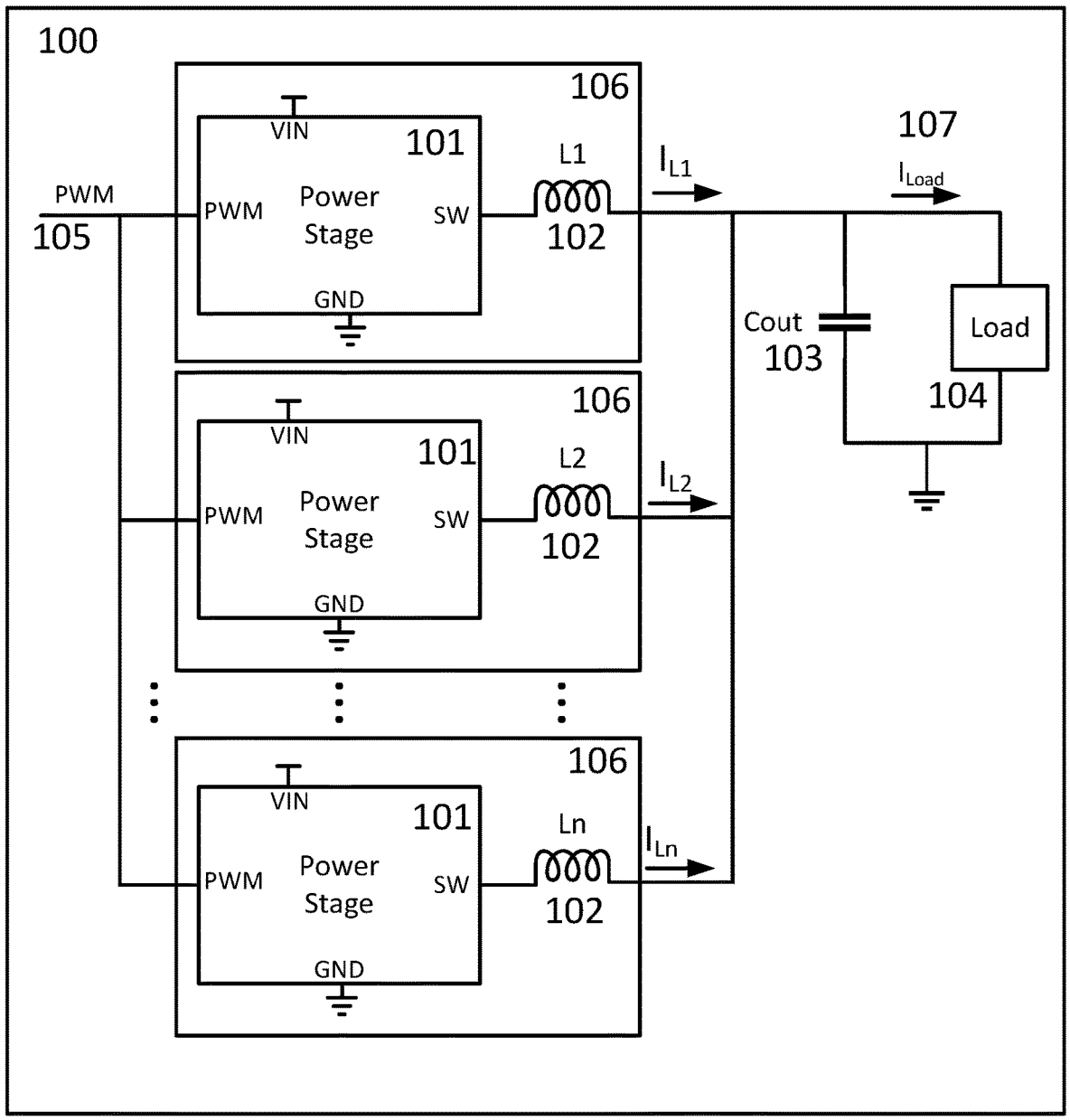
FIG. 1 illustrates an example of an existing multiphase voltage regulator system

FIG. 1 depicts the existing multiphase voltage regulator system 100, comprising "n" power stages 101 with each power stage 101 coupled to an inductor (L1~Ln) 102, an output capacitor 103, and a load 104. All power stages receive the same PWM (Pulse-Width-Modulation) signal 105. Each power stage and its respectively coupled inductor represents one phase 106 of the multiphase voltage regulator. The load 104 is connected to the multiphase voltage regulator via the inductors and an output capacitor 103. Ideally, the load current $I_{Load}$ 107 is evenly shared among all phases, which means $I_{L1}=I_{L2}=\ldots=I_{Ln}=I_{Load}/n$. However, the current through each phase may not be the same in most cases due to the parameter tolerance among all power stages, such as the mismatch of the rising edge delay and the falling edge delay. Thus, power stages carrying larger current could trigger over-temperature or over-current protection. The unbalanced current also causes temperature mismatching among phases, which could also result in shorter lifetime and worse reliability for multiphase voltage regulator.

Figure 2:
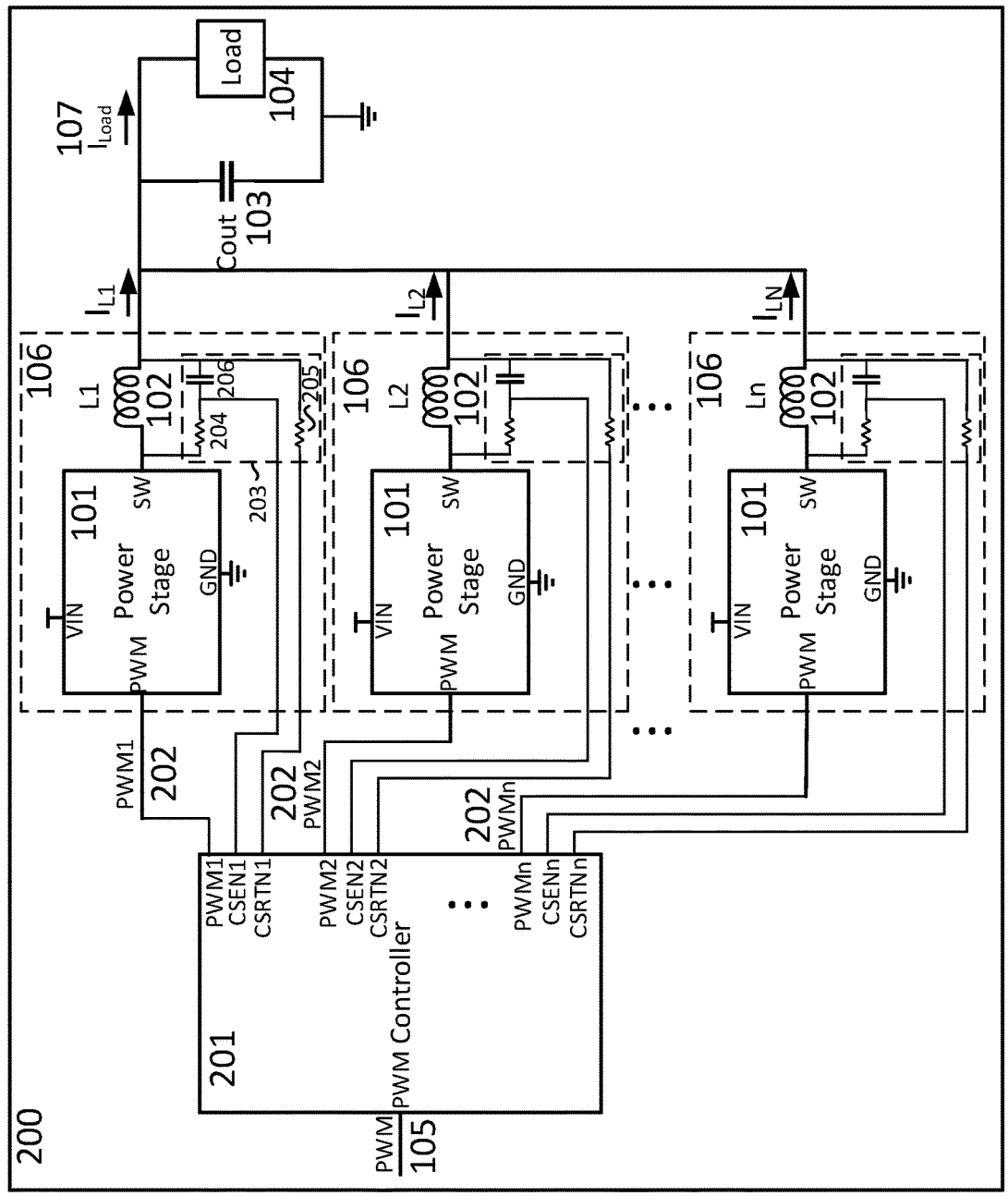
FIG. 2 illustrates an example of an existing multiphase voltage regulator system with conventional current sharing solution which requires a current balancing controller.

FIG. 2 depicts another existing multiphase voltage regulator system 200 in which a controller is introduced to implement close-loop current balancing control. Based on the system illustrated in FIG. 1, a controller 201 is introduced to convert the input PWM signal 105 into n channels of individual PWM signal 202. To regulate the current flow through each phase, the controller 201 modifies the time of the PWM signal's rising edge and falling edge for each channel. Also, the controller 201 measures the current flow through each phase's inductor by a passive network 203, which comprises two resistors, 204 and 205, and a capacitor 206. With proper values for resistors and capacitors, the voltage across the capacitor 206 is almost proportional to the current through the inductor 102. Thus, the current balancing control can be implemented by measuring all phase's current through the passive network and modifies the PWM signal for each phases accordingly.

Figure 3:
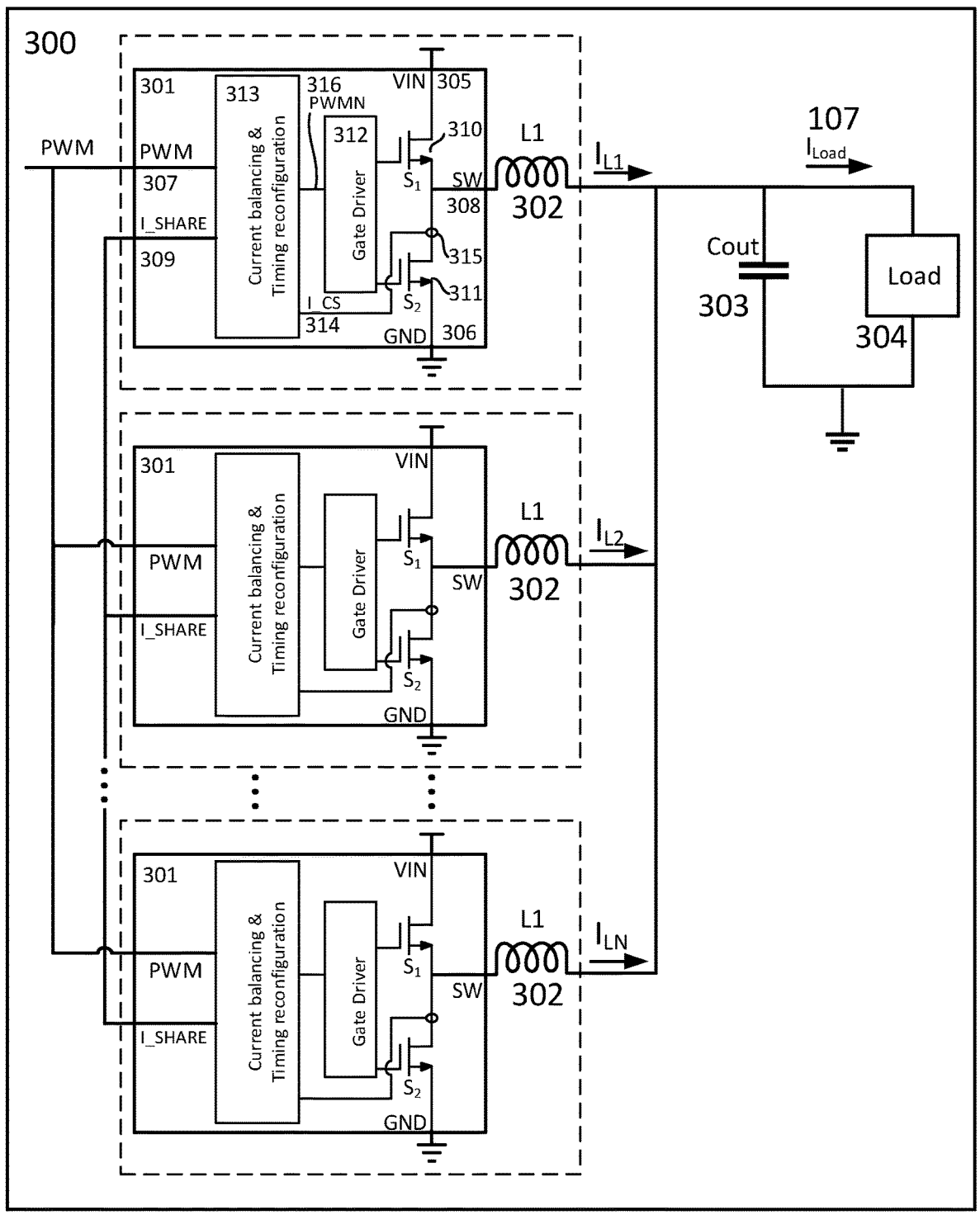
FIG. 3 illustrates an example of a current sharing system constructed in accordance with the invention.

FIG. 3 illustrates the preferred embodiment 300, which comprises a plurality of power stages 301 with each power stage 301 coupled to an inductor 302, an output capacitor 303, and a load 304. Each power stage has a VIN terminal 305, a GND terminal 306, a PWM pin 307, and an SW pin 308. Different from the existing multiphase voltage regulator system illustrated in FIG. 1, each power stage 301 has an I_SHARE terminal 309 and all the power stages' I_SHARE terminals are connected.

Similar to the existing power stage solution, the proposed power stage 301 consists of two power switches $S_1$ 310 and $S_2$ 311, and a gate driver circuit 312. In addition, there is a current balancing and timing reconfiguration block 313. The current balancing and timing reconfiguration block 313 measures the current through the low-side power switch $I_{CS}$ 314 through a current sensing circuit 315 and determines the output signal PWMN 316 based on the input signal PWM 307, $I_{CS}$ signal 314, and the I_SHARE signal 309. The output signal PWMN 316 is then sent to the gate driver circuit 312 to control the on/off state of power switches $S_1$ 310 and $S_2$ 311.

Figure 4:
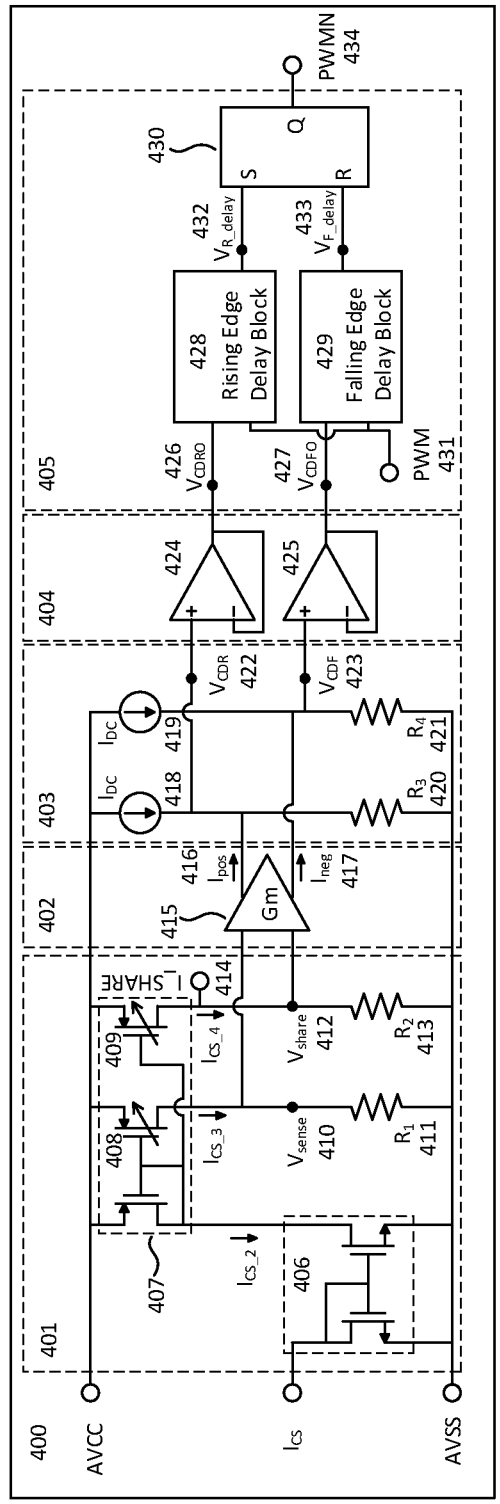
FIG. 4 illustrates an example power stage circuit diagram constructed in accordance with the invention.

FIG. 4 illustrates the detailed circuit diagram of the current balancing and timing reconfiguration block 400, which includes a current comparator stage 401, a differential amplifier stage 402, a voltage offset circuit 403, a voltage buffer stage 404, and a timing reconfiguration stage 405. The current comparator stage 401 consists of a current mirror circuit 406 and a current comparator circuit 407. The current mirror circuit 406 duplicates the input current signal $I_{CS}$ to $I_{CS\_2}$. The current comparator circuit 407 consists of two gain adjustable current mirror circuits, 408 and 409. The first current mirror circuit 408 converts the $I_{CS\_2}$ signal to an $I_{CS\_3}$ signal and then converts the $I_{CS\_3}$ signal to a voltage signal $V_{sense}$ 410 through a resistor $R_1$ 411. The voltage signal $V_{sense}$ 410 satisfies the following equation:

$$V_{sense.i} = I_{CS\_4.i}R_1 = I_{CS.i}R_1$$

where "i" is the phase number.

The second current mirror circuit 409 is identical to the first current mirror circuit 408, which converts the $I_{CS\_2}$ signal to an $I_{CS\_4}$ signal and then convert the $I_{CS\_4}$ signal to a voltage signal $V_{share}$ 412 through a resistor $R_2$ 413. Also, the output is connected to the I_SHARE terminal X. Since all power stages' I_SHARE terminals are connected, the voltage at I_SHARE terminal 414 satisfies the following equation:

$$V_{share} = (I_{CS.1} + I_{CS.2} + \ldots + I_{CS.n})\frac{R_2}{n}$$

The resistance of $R_2$ equals to $R_1$ can be designed to be the same. Therefore, the equation above can be simplified into, $$V_{share} = \frac{(I_{CS\_4.1} + I_{CS\_4.2} + \ldots + I_{CS\_4.n})}{n}R_1$$

Thus, the voltage difference between $V_{sense}$ and $V_{share}$ represents the difference between the load current flow through this phase and the average current of the total load current. Then, this voltage difference signal is sent to the differential amplifier stage 402. The differential amplifier 415 first converts the input voltage signal to two current signal: $I_{pos}$ 416 and $I_{neg}$ 417, where $I_{pos}$ and $I_{neg}$ satisfy the following equations:

$$\begin{cases} I_{pos} + I_{neg} = 0 \\ (I_{pos} + I_{neg}) = G_m(V_{sense} - V_{share}) \end{cases}$$

The next stage is a voltage offset circuit 403, which includes two identical reference current sources, 418 and 419 and two resistors, $R_3$ 420 and $R_4$ 421. The $I_{pos}$ signal and $I_{neg}$ signal are converted into voltage signals, $V_{CDR}$ 422 and $V_{CDF}$ 423, which satisfy the following equation:

$$\begin{cases} V_{CDR} = (I_{DC} + I_{POS})R_3 \\ V_{CDF} = (I_{DC} + I_{neg})R_4 \end{cases}$$

When $R_3$ 420 and $R_4$ 421 are equal, the voltages, $V_{CDR}$ 422 and $V_{CDF}$ 423, have the same gain and positive voltage offset.

Since the voltage signal $V_{CDR}$ and $V_{CDF}$ have no driving capability, a voltage buffer stage 404 is added after the voltage offset stage 403 to increase the driving capability. $V_{CDR}$ 422 and $V_{CDF}$ 423 are sent to two voltage follower circuits, 424 and 425, respectively to generate the output signal $V_{CDRO}$ 426 and $V_{CDFO}$ 427, where $V_{CDRO}$ 426 is equal to $V_{CDR}$ 422 and $V_{CDFO}$ 427 is equal to $V_{CDF}$ 423.

The timing reconfiguration stage 405 includes a rising edge delay block 428, a falling edge delay block 429, and an S-R trigger 430. The rising edge delay block 428 adds an adjustable time delay to the rising edge of the PWM signal 431 according to the voltage of the $V_{CDRO}$ signal 426. The output signal $V_{R\_delay}$ 432 is sent to the "S" input of the S-R trigger 430. The falling edge delay block 429 first generates the inverted PWM signal PWM_INV and then adds an adjustable time delay to the rising edge of PWM_INV according to the voltage of the $V_{CDFO}$ signal 427. The output signal $V_{F\_delay}$ 433 is sent to the "R" input of the S-R trigger 430. The output signal PWMN 434 of the S-R trigger 430 is sent to the gate driver block and control the on/off state of the power switches in the power stage.

Figure 5:
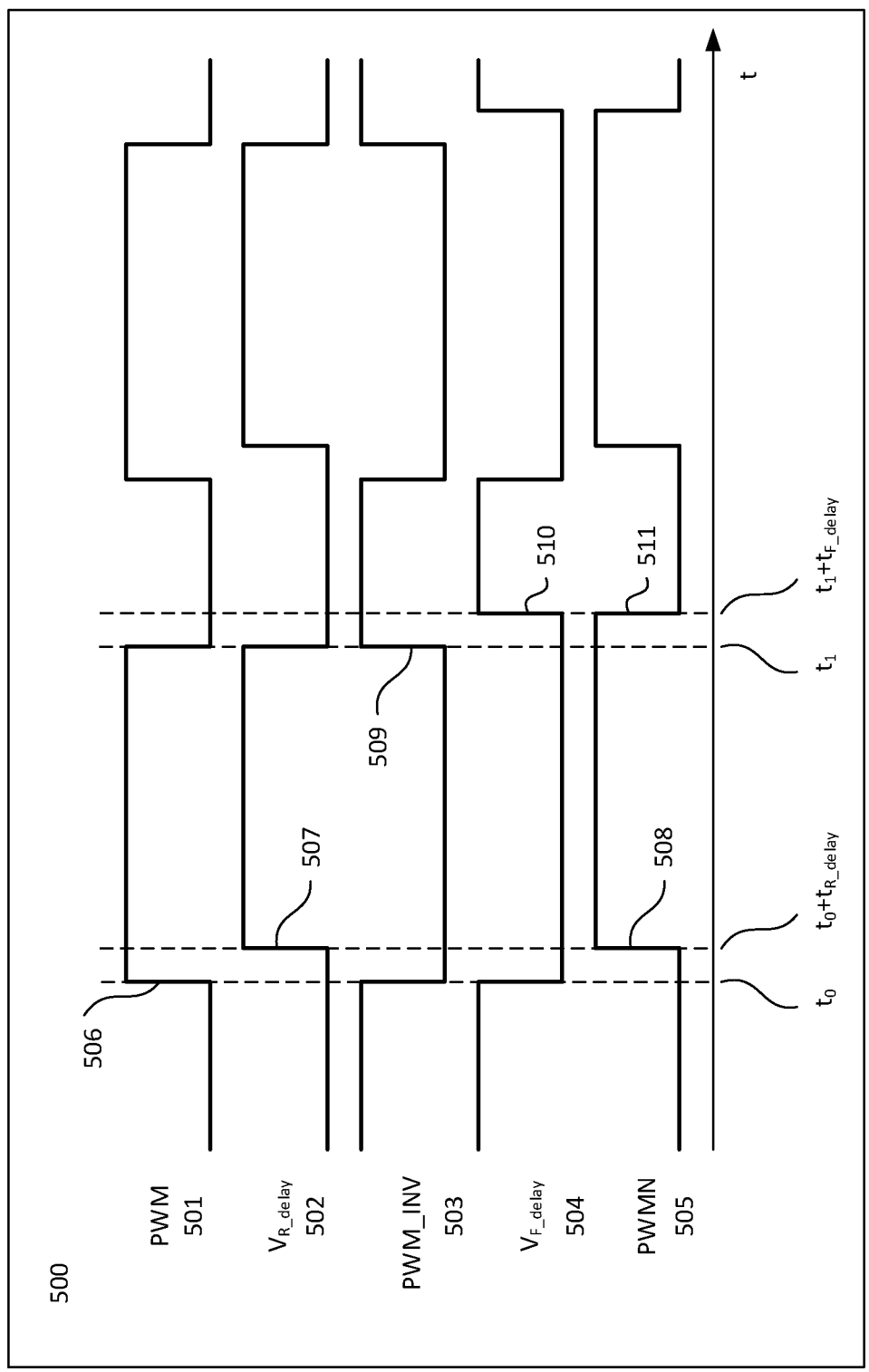
FIG. 5 illustrates a typical waveform of signals in the timing reconfiguration block in accordance with the invention.

FIG. 5 illustrates a typical waveform of signals in the timing reconfiguration block in accordance with the invention 500. The waveform includes the signals of PWM 501, $V_{R\_Delay}$ 502, PWM_INV 503, $V_{F\_Delay}$ 504, and PWMN 505. At t0, PWM is set 506. The rising edge delay block determines the delay time $t_{R\_Delay}$ for the rising edge according to the voltage of $V_{CDRO}$. At $t_0 + t_{R\_Delay}$, $V_{R\_Delay}$ is set 507. As a result, PWMN is set by the S-R trigger 508. At $t_1$, PWM is cleared so that PWM_INV is set 509. The falling edge delay block determines the delay time $t_{F\_Delay}$ for the falling edge according to the voltage of $V_{CDFO}$. At $t_1 + t_{F\_Delay}$, $V_{F\_Delay}$ is set 510. As a result, PWMN is cleared by the S-R trigger 511.

What is claimed is:

1. A multiphase voltage regulator system, comprising:
   two or more power stage chips, wherein each power stage chip includes a PWM pin; a PVIN pin; a GND pin; an SW pin; two internal switches, wherein each internal switch contains a gate driver circuit; an I_SHARE pin; and a current balancing and timing reconfiguration block, wherein the current balancing and timing reconfiguration block further comprises:
   a current mirror circuit;
   a first adjustable gain current mirror circuit;
   a first resistor;
   a second adjustable gain current mirror circuit to produce a current source;
   a second resistor with one terminal connected to an AVSS and the other terminal connected to the output of the second adjustable gain current mirror circuit current source and the I_SHARE pin;
   a differential amplifier;
   an offset circuit that consists of two identical current sources and two resistors;

a voltage buffer circuit;
a rising edge delay block;
a falling edge delay block; and
an S-R trigger with an "S" terminal connected to the output of the rising edge delay block and an "R" terminal connected to the output of the falling edge delay block;

two or more inductors, wherein one terminal of each inductor is connected to the SW pin of the power stage chip and the other terminal of all the inductors is connected together to form an output terminal;

a ground terminal; and one or more output voltage filter capacitors, wherein the output voltage filter capacitor is connected between the output terminal of the inductors and the ground terminal.

* * * * *